(12) United States Patent
Williams

(10) Patent No.: US 6,658,786 B1
(45) Date of Patent: Dec. 9, 2003

(54) FISHING GEAR CADDY

(76) Inventor: Frank L. Williams, Rte. 7 Box 43, Marietta, OH (US) 45750

( * ) Notice: Subject to any disclaimer, the term of this patent is extended or adjusted under 35 U.S.C. 154(b) by 0 days.

(21) Appl. No.: 10/176,144

(22) Filed: Jun. 20, 2002

(51) Int. Cl.[7] ............................................. A01K 97/00
(52) U.S. Cl. ...................................................... 43/54.1
(58) Field of Search .................................. 43/54.1, 21.2

(56) References Cited

U.S. PATENT DOCUMENTS

| | | | | |
|---|---|---|---|---|
| 3,603,019 A | * | 9/1971 | Smeltzer | 43/21.2 |
| 3,667,708 A | * | 6/1972 | Smeltzer | 248/512 |
| D288,953 S | * | 3/1987 | Hansen | D22/136 |
| 4,845,881 A | * | 7/1989 | Ward | 43/21.2 |
| 5,131,179 A | * | 7/1992 | McEwen | 43/21.2 |
| 5,209,009 A | * | 5/1993 | Fast | 43/54.1 |
| 5,303,500 A | * | 4/1994 | Luukonen | 43/54.1 |
| 5,305,542 A | * | 4/1994 | Phelps | 43/21.2 |
| 5,311,698 A | * | 5/1994 | Plost | 43/54.1 |
| 5,319,877 A | * | 6/1994 | Hagan | 43/54.1 |
| 5,471,779 A | * | 12/1995 | Downey | 43/54.1 |
| 5,634,291 A | * | 6/1997 | Pham | 43/57 |
| D384,391 S | * | 9/1997 | Bastian | D22/148 |
| 6,253,484 B1 | * | 7/2001 | O'Connor | 43/21.2 |
| 6,487,814 B1 | * | 12/2002 | Arredondo et al. | 43/54.1 |
| 6,530,170 B1 | * | 3/2003 | Sweeney | 43/21.2 |

FOREIGN PATENT DOCUMENTS

GB    2226948    * 7/1990

* cited by examiner

*Primary Examiner*—Charles T. Jordan
*Assistant Examiner*—Jordan Lofdahl

(57) ABSTRACT

A FISHING GEAR CADDY for holding a plurality of fishing rods and fishing gear includes a container having a bottom wall and a peripheral wall that is attached to and extends upwardly from the bottom wall. Each of a plurality of sleeves has an upper edge and a lower edge. Each of the sleeves is removably attached to an outer surface of the peripheral wall by brackets such that the sleeves are spaced from the peripheral wall. Each of the upper edges extends above the peripheral wall at a different height.

6 Claims, 4 Drawing Sheets

FISHING GEAR CADDY

BACKGROUND OF THE INVENTION

1. Field of the Invention

The present invention relates to caddy devices and more particularly pertains to a new caddy device for holding a plurality of fishing rods and other fishing devices.

2. Description of the Prior Art

The use of caddy devices is known in the prior art. U.S. Pat. No. 5,634,291 describes a device for holding a plurality of fishing rods while also holding bait. Another type of caddy device is U.S. Pat. No. 5,471,779 having a chest with a holder for holding a fishing rod.

While these devices fulfill their respective, particular objectives and requirements, the need remains for a device that includes holders at different levels so that multiple rods may be held at one time without the fishing lines from the rods entangling each other.

SUMMARY OF THE INVENTION

The present invention meets the needs presented above by offering staggered fishing pole holders so that any fishing rods held by the device will be held at different levels.

Still yet another object of the present invention is to provide a caddy device that allows a user to hold live bait within the container which also serves as a weight to stabilize the device.

To this end, the present invention generally comprises a container has a bottom wall and a peripheral wall is attached to and extending upwardly from the bottom wall. Each of a plurality of sleeves has an upper edge and a lower edge. Each of the sleeves is removably attached to an outer surface of the peripheral wall by brackets such that the sleeves are spaced from the peripheral wall. The upper edges each extend above the peripheral wall at a different height.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
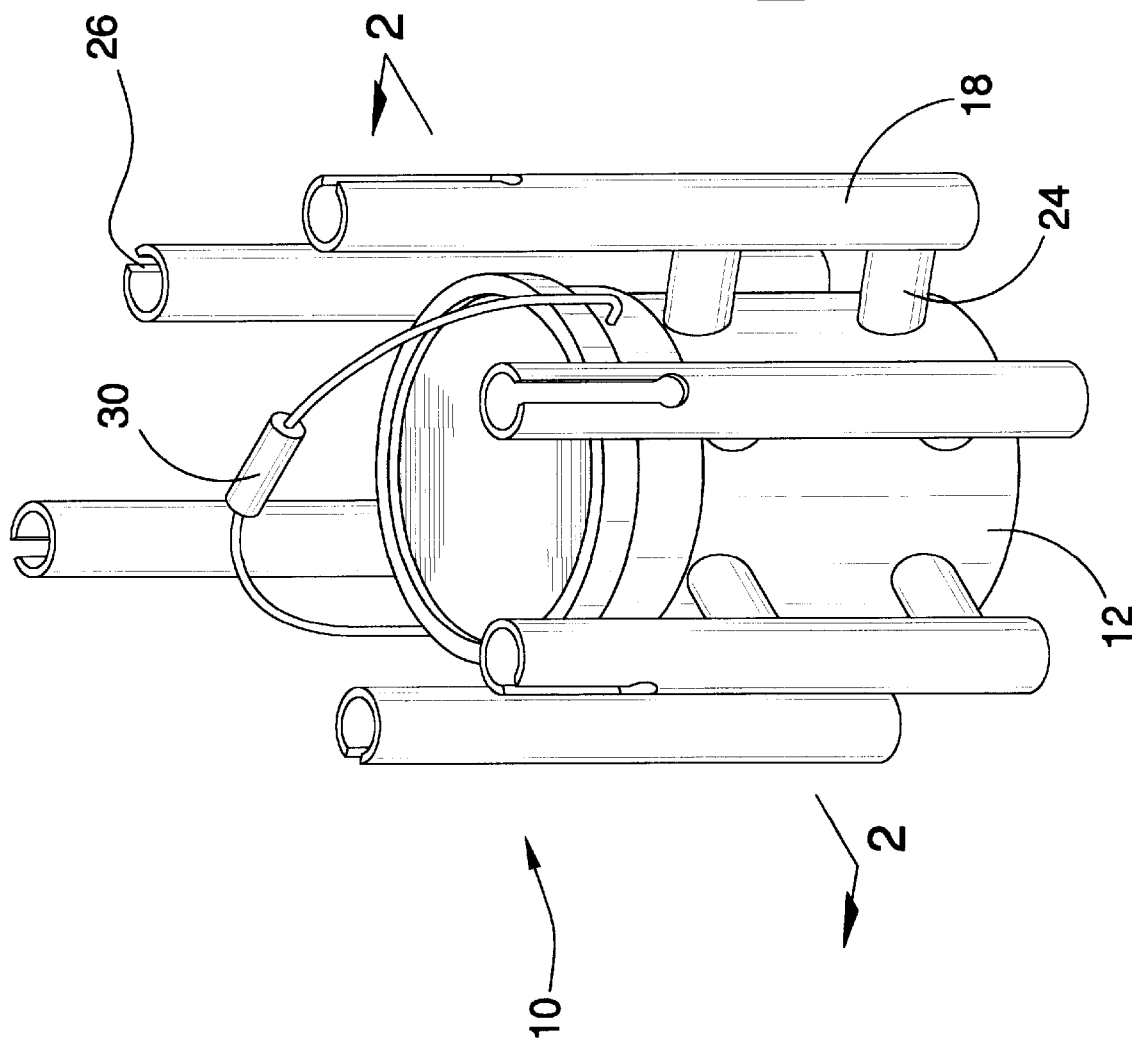
FIG. 1 is a schematic perspective view of a fishing gear caddy according to the present invention.
Figure 2:
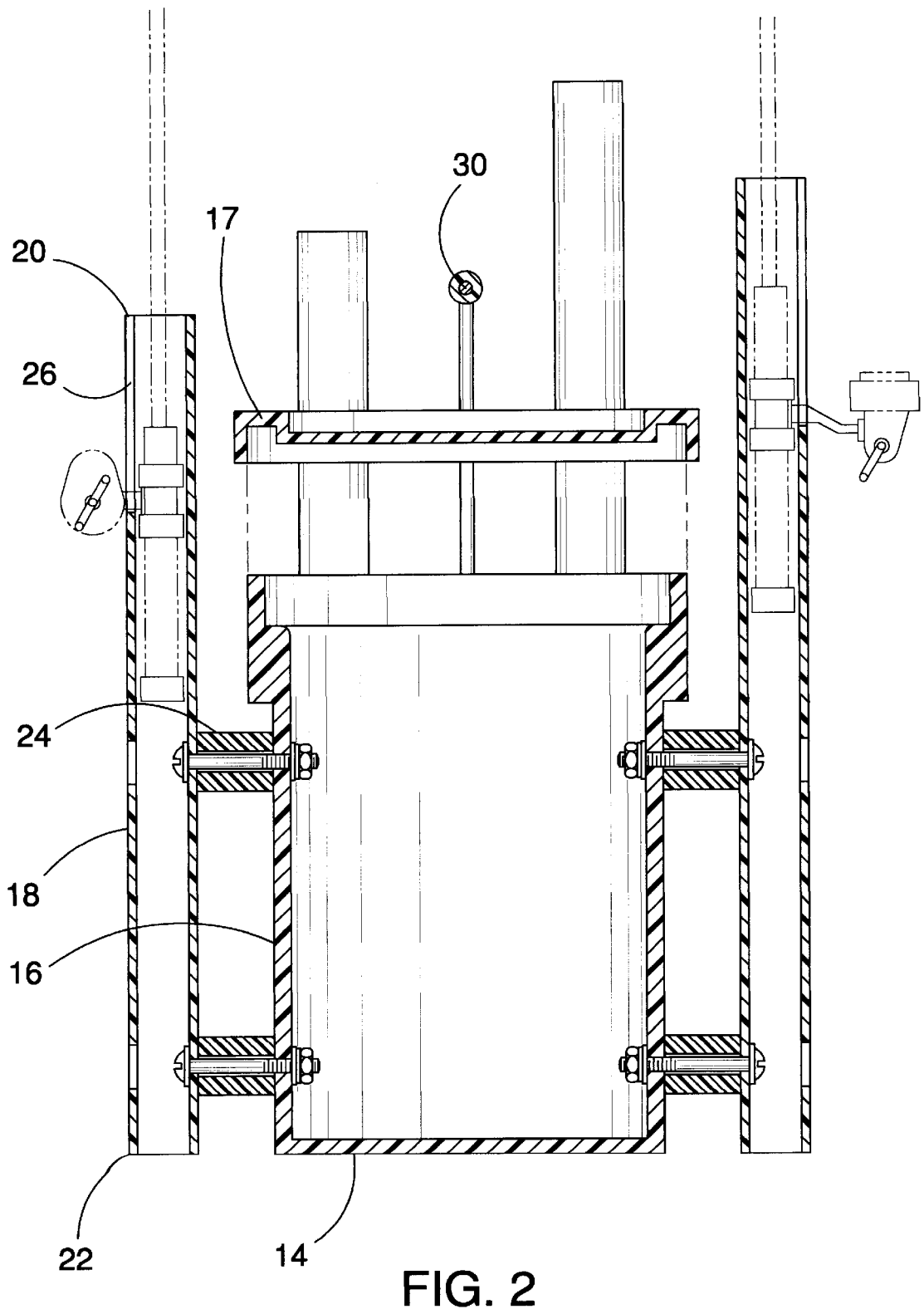
FIG. 2 is a schematic cross-sectional view taken along line 2—2 of FIG. 1 of the present invention.

With reference now to the drawings, and in particular to FIGS. 1 through 4 thereof, a fishing gear caddy device embodying the principles and concepts of the present invention and generally designated by the reference numeral 10 will be described.

As best illustrated in FIGS. 1 through 4, the fishing gear caddy 10 generally includes a container 12 having a bottom wall 14. A peripheral wall 16 is attached to and extends upwardly from the bottom wall 14. The bottom wall 14 has a generally circular shape. A lid 17 is removably attachable to the peripheral wall to selectively open and close the container 12.

Figure 3:
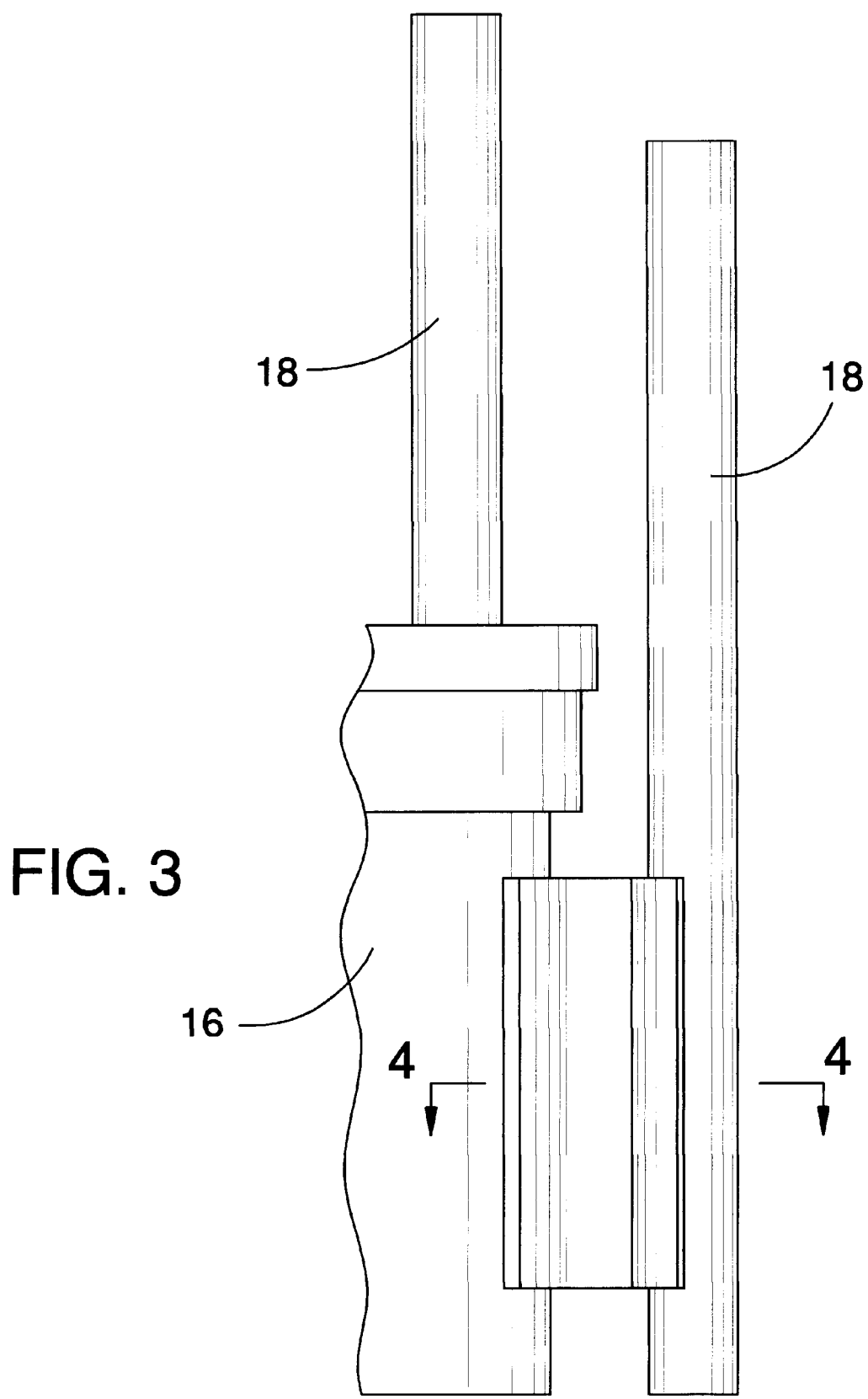
FIG. 3 is a schematic side view of a second embodiment of the present invention.
Figure 4:
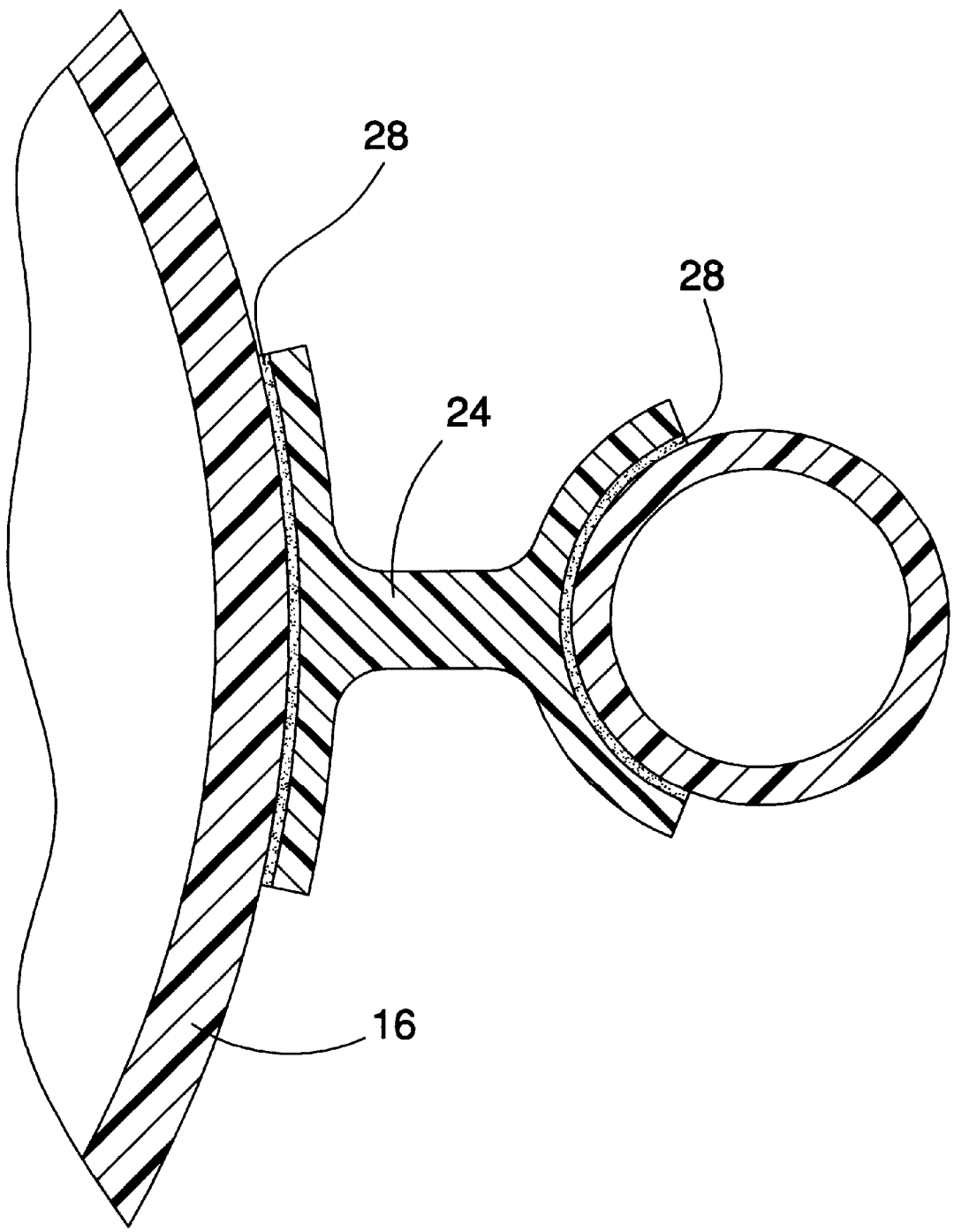
FIG. 4 is a schematic cross-sectional view taken along line 4—4 of FIG. 3 of the present invention.

Each of a plurality of sleeves 18 has an upper edge 20 and a lower edge 22. Each of the sleeves 18 is attached to an outer surface of the peripheral wall 16 by brackets 24 such that the sleeves 18 are spaced from the peripheral wall 16. The sleeves 18 are positioned generally equidistant from each other. The plurality of sleeves 18 is preferably four sleeves. The sleeves 18 each have a notch 26 in the upper edge 20. Each of the notches 26 extends downward and each of the notches 26 generally faces away from the container 12. The upper edges 20 extend above the peripheral wall 14. The upper edges 20 extend above the peripheral wall 14 at a different height form each other. Each of the lower edges 22 is generally flush with the bottom wall 14. The brackets 24 may include removable brackets 24 as shown in FIGS. 3 and 4. By use of an adhesive 28, the positioning of the sleeves 24 may be selectively determined by the used of the device 10.

A handle 30 is hingedly attached to the container 12. The handle 30 transverses an opening defined by an upper edge of the peripheral wall 16.

In use, the container 12 may be used for holding fishing gear, live bait or fish that are caught. The sleeves 18 have notches 26 for receiving the base of a fishing real. By having the sleeves 18 with upper edges 20 positioned at staggered heights with respect to each other, multiple fishing rods may be extended into the sleeves such that they are positioned at different heights. By doing this, there is a less chance of the lines becoming entangled with each other. Also, the device 10 serves the purpose of holding rods so that the hands of the user are free to do other tasks without risk of losing the rod should a fish strike the bait.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod and fishing gear holding device, said device comprising:

a container having a bottom wall, a peripheral wall being attached to and extending upwardly from said bottom wall; and a plurality of sleeves, each of said sleeves having an upper edge and a lower edge, each of said sleeves having a different height from said upper edge to said lower edge, said plurality of sleeves including at least four sleeves;

a plurality of brackets, each of said brackets being attached to one of said a sleeves by an adhesive such that each of said sleeves is vertically orientated, each of said brackets being attached to an outer surface of said container in a fixed orientation by an adhesive such that each of said sleeves is spaced from said container and each of the sleeves extends above the container, wherein said brackets and a corresponding sleeve attached thereto are selectively positionable on said container.

2. The fishing rod and fishing gear holding device as in claim 1, wherein each of said sleeves is positioned generally equidistant from each other.

3. The fishing rod and fishing gear holding device as in claim 1, wherein each of said sleeves has a notch in said upper edge, each of said notches extending downward, wherein each of said notches generally faces away from said container such that each of said notches faces a different direction with respect to each other.

4. The fishing rod and fishing gear holding device as in claim 1, wherein each of said lower edges is generally flush with said bottom wall.

5. The fishing rod and fishing gear holding device as in claim 1, further including a handle being hingedly attached to said container.

6. A fishing rod and fishing gear holding device, said device comprising:

a container having a bottom wall, a peripheral wall being attached to and extending upwardly from said bottom wall, said bottom wall having a generally circular shape;

a plurality of sleeves, each of said sleeves having an upper edge and a lower edge, each of said sleeves being attached to an outer surface of said peripheral wall in a vertically fixed orientation by brackets such that said sleeves are spaced from said peripheral wall, each of said brackets being attached to said peripheral wall by an adhesive, each of said sleeves being positioned generally equidistant from each other, said plurality of sleeves being four sleeves, each of said sleeves have a notch in said upper edge, each of said notches extending downward, each of said notches generally facing away from said container such that said notches each extend in a different direction with respect to each other, each of said upper edges extending above said peripheral wall, each of said upper edges extending above said peripheral wall at a different height, each of said lower edges being generally flush with said bottom wall; and a handle being hingedly attached to said container, said handle transversing an opening defined by an upper edge of said peripheral wall.

\* \* \* \* \*